United States Patent

Bruchmann et al.

(10) Patent No.: US 6,566,481 B2
(45) Date of Patent: May 20, 2003

(54) POLYISOCYANATES WITH ALLOPHANATE GROUPS DERIVED FROM ALICYCLIC ALKANEDIOLS

(75) Inventors: Bernd Bruchmann, Freinsheim (DE); Hans Renz, Meckenheim (DE); Günter Mohrhardt, Speyer (DE); Hubert Baumgart, Münster (DE); Simone Bitter, Senden (DE)

(73) Assignees: BASF Aktiengesellschaft, Ludwigshafen (DE); BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/769,310

(22) Filed: Jan. 26, 2001

(65) Prior Publication Data

US 2001/0034429 A1 Oct. 25, 2001

(30) Foreign Application Priority Data

Feb. 5, 2000 (DE) .......................... 100 05 228

(51) Int. Cl.$^7$ .............................. C08G 18/10
(52) U.S. Cl. ................ 528/59; 252/182.21; 528/67; 428/423.1; 427/385.5; 560/132
(58) Field of Search ....................... 252/182.21; 528/59, 528/67; 428/423.1; 427/385.5; 560/132

(56) References Cited

U.S. PATENT DOCUMENTS 4,913,972 A * 4/1990 Grunewalder et al.

FOREIGN PATENT DOCUMENTS

| DE | 196 52 221 | 6/1998 |
|---|---|---|
| EP | 0 000 194 | 1/1979 |
| EP | 0 303 150 A2 | 2/1989 |
| EP | 0 496 208 A2 | 7/1992 |
| EP | 0 524 501 A1 | 1/1993 |
| EP | 0 566 037 A2 | 10/1993 |
| FR | 2 767 328 | 2/1999 |
| WO | 99/36455 | * 7/1999 |

* cited by examiner

Primary Examiner—Rachel Gorr
(74) Attorney, Agent, or Firm—Oblon, Spivak, McClelland, Maier & Neustadt, P.C.

(57) ABSTRACT

A polyisocyanate of formula (I)

$$OCN-R^1-[-NX-CO-O-R^2-O-CO-NH-R^1-]_n-NCO$$

in which the units $R^1$, X and $R^2$ have the meanings:

$R^1$ is a unit of the formula (II):

$$-CH_2-CH_2-CH_2-CH_2-CH_2-CH_2- \quad (II)$$

X is hydrogen or a unit of the formula (III):

$$-CO-NH-R^1-NCO \quad (III),$$

with the proviso that at least one of the units X in the polyisocyanates is a unit of formula (III); and $R^2$ • is a 4-, 5- or 6-membered cycloalkylene group containing radical.

12 Claims, No Drawings

POLYISOCYANATES WITH ALLOPHANATE GROUPS DERIVED FROM ALICYCLIC ALKANEDIOLS

The present invention relates to polyisocyanates of the formula (I)

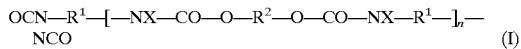

in which the units $R^1$, X and $R^2$ have the following meanings:

$R^1$ is a unit of the formula (II)

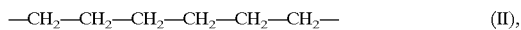

X is hydrogen or a unit of the formula (III)

with the proviso that at least one of the units X in the polyisocyanates of the formula I is a unit of the formula III; and $R^2$
- is a 4-, 5- or 6-membered cycloalkylene radical in which up to 4 hydrogen atoms may be substituted by $C_1$ to $C_4$ alkyl radicals and one or two methylene units may be substituted by an oxygen atom, a sulfur atom and/or a tertiary nitrogen atom which additionally carries a $C_1$ to $C_4$ alkyl radical, or
- is a $C_2$ to $C_4$ alkylene radical in which inserted between 2 carbon atoms or between one carbon atom and a hydrogen atom there is a 4-, 5- or 6-membered cycloalkylene radical in which up to 4 hydrogen atoms may be substituted by $C_1$ to $C_4$ alkyl radicals and one or two methylene units may be substituted by an oxygen atom, a sulfur atom and/or a tertiary nitrogen atom which additionally carries a $C_1$ to $C_4$ alkyl radical, and the index n is 1, 2 or 3.

The invention additionally relates to isocyanate mixtures and to 2-component coating compositions comprising these isocyanates; to coating processes in which these 2-component coating compositions are used; and to the coated articles produced by these processes. Crosslinking polyisocyanates and binder components having isocyanate-reactive groups are widely known in the form of, for example, 2-component (2 K) coating materials (cf. Kunststoff Handbuch, Volume 7, Polyurethane, $2^{nd}$ edition, 1993, Carl Hanser Verlag Munich Vienna, pp. 599 to 642, and M. Bock, Polyurethane Für Lacke und Beschichtungen, Vincentz-Verlag, Hannover, 1999). These 2-component coating compositions comprise as binder, for example, a polymeric polyol and as crosslinker component (hardener) a compound having two or more free isocyanate groups.

The service properties of coating materials whose polymeric binders have been crosslinked with the isocyanates are much better than those systems comprising low molecular mass binders. This relates in particular to service properties such as insensitivity to mechanical exposure such as tension, strain, impact or abrasion;

resistance to moisture (in the form, for example, of water vapor) and dilute chemicals;

resistance to environmental influences such as temperature fluctuations and UV radiation; and high gloss of the coated surfaces.

The hardeners (gelling agents) are expected not only to give the cured coatings the abovementioned service properties but also to improve, or at least have very little adverse effect on, the processing properties of the coating materials prior to their application.

So that the coating materials can be applied without problems by customary techniques, for example, by spraying them onto the surface to be coated, the coating materials are intended to possess a limited viscosity. Consequently, 2-component coating materials normally comprise solvents. The high solvent content of these coating materials itself causes problems however, since the coating-material processors have to take complex measures to avoid atmospheric emission of the solvents released when the coating materials are applied and dried. The search has therefore been on for hardeners which do not greatly increase the viscosity of the binder-containing component or which, even better, reduce it. These hardeners themselves of course must not display any noticeable volatility at room temperature, as is the case with customary commercial monomeric isocyanates such as hexamethylene diisocyanate or isophorone diisocyanate.

In addition, following their application, the 2-component coating compositions should cure as rapidly as possible so that the coated articles, following the application, may be subjected rapidly to further processing or use.

Polyisocyanates containing allophanate and biuret groups are known, for example, from EP-A-496 208, 524 501, 566 037 and WO 99/36455, where they are recommended for use as hardeners in 2-component coating systems. Suitable structural components include aliphatic monoalcohols and all customary isocyanates.

EP-303 150 discloses polyisocyanates containing allophanate groups, which are derived inter alia from diisocyanates and aliphatic alkanediols. The structural components from the group of the cyclic alkanediols and hexamethylene diisocyanate are present in these documents only in the context of lists of the suitable isocyanate and alcohol components. As evident from the experimental section of these documents, the focus is on polyisocyanates containing allophanate and biuret groups which are derived from noncyclic alcohols.

The allophanates derived from these alcohols have the disadvantage, in particular, that the 2 K coating systems produced with them are relatively slow to cure and even following complete curing still have a level of surface hardness which is inadequate for many applications.

Although the properties of the hardeners disclosed therein satisfy in most respects the customary requirements imposed on the processing properties of the uncured liquid coating systems which comprise these hardeners, and on the service properties of the coatings produced with the coating materials, these hardeners still appear in need of improvement with regard to the viscosity of the coating systems, their rate of cure, and the hardness of the coatings produced with them.

It is an object of the invention to provide this improvement.

We have found that this object is achieved by the compounds of the formula (I) defined at the outset, by mixtures and 2-component coating compositions comprising these compounds, and by articles coated with these 2-component coating compositions. The polyisocyanates of the formula (I) according to the invention are derived preferably from alcohols such as 1,3- or 1,4-cyclohexanediol, 1,4-cyclohexanedimethanol, 1,3-cyclopentanediol or tetramethyl-1,3-cyclobutanediol.

Among these, particular preference is given to those wherein n=1 and both units X are units of the formula III (diisocyanates Ia), or n=1, one of the two units X is hydrogen and the other unit X is a unit of the formula III (diisocyanates Ib).

The polyisocyanates of the invention are normally prepared by
(i) reacting hexamethylene diisocyanate with a
   divalent 4-, 5- or 6-membered cycloaliphatic alcohol in which up to 4 hydrogen atoms attached to a carbon atom may be substituted by $C_1$ to $C_4$ alkyl radicals and one or two methylene units may be substituted by an oxygen atom, a sulfur atom and/or a tertiary nitrogen atom which additionally carries a $C_1$ to $C_4$ alkyl radical, or
   divalent $C_2$ to $C_4$ alkanediol in which inserted between 2 carbon atoms or between one carbon atom and a hydrogen atom there is a 4-, 5- or 6-membered cycloalkylene radical in which up to 4 hydrogen atoms may be substituted by $C_1$ to $C_4$ alkyl radicals and one or two methylene units may be substituted by an oxygen atom, a sulfur atom and/or a tertiary nitrogen atom which additionally carries a $C_1$ to $C_4$ alkyl radical,
the molar ratio of hexamethylene diisocyanate to the abovementioned alkanediols being from 50:1 to 3:1, preferably from 30:1 to 5:1, in the presence or absence of a catalyst which accelerates the formation of allophanates and urethanes,
(ii) deactivating the catalyst, if present, and
(iii) removing any unreacted isocyanate.

The reaction may be performed, for example, in the manner described in EP-A-524 501.

Examples of the catalysts used are quaternary ammonium carboxylates, such as N,N,N-trimethyl-N-(2-hydroxypropyl)ammonium 2-ethylhexanoate, quaternary ammonium hydroxides, or organotin or organozinc compounds.

The reaction is generally conducted at temperatures from 50 to 180° C.

The reaction is generally continued until from 3 to 8 times the molar amount of isocyanate groups corresponding to the molar amount of divalent alcohol originally present in the reaction mixture have reacted. The progress of the reaction may be followed, for example, in accordance with customary titrimetric methods by measuring the NCO content of the reaction mixture.

The reaction is ended by cooling the reaction mixture and, if a catalyst has been used, by removing it, subjecting it to thermal decomposition, or adding a suitable agent which deactivates the catalyst. Examples of such agents are acids such as p-toluenesulfonic acid or dialkyl phosphates, e.g., dibutyl phosphate or di(2-ethylhexyl) phosphate.

After the end of the reaction, unreacted hexamethylene diisocyanate is generally removed by distillation, preferably down to a level of less than 0.5% by weight.

The reaction product, which is essentially free from hexamethylene diisocyanate, has a viscosity at room temperature of generally from 500 to 20,000 mPas, preferably from 1000 to 15,000 mPas measured in accordance with ISO 3219.

This procedure normally produces mixtures (M) comprising
polyisocyanates I,
urethanes of the formula IV (urethane IV)

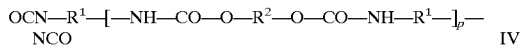

in which
   the units $R^1$ and $R^2$ are as defined for formula I
   and p is a number from 1 to 3,
the polyisocyanurates derived from hexamethylene diisocyanate.

Preferably, the fraction of polyisocyanates I is at least 10% by weight.

Particular preference is given to mixtures (M) comprising
from 20 to 80% by weight of polyisocyanates I,
from 0 to 50% by weight of urethanes IV, and
from 0 to 80% by weight of polyisocyanurates derived from hexamethylene diisocyanate.

The mixtures (M) may further comprise products of higher molecular mass, which come about as a result of the reaction of the polyisocyanates I with further hexamethylene diisocyanate or with the other types of molecule present in the mixture (M), to form uretdione groups, biuret groups, or isocyanurate groups. In general, the mixtures (M) contain such products in amounts of up to 20% by weight.

If desired, the polyisocyanates I of the invention may easily be separated from these mixtures by means of known separation methods such as gel permeation chromatography or high-performance liquid chromatography. Generally, however, this is unnecessary insofar as the polyisocyanates I are used in the form of the abovementioned mixtures as crosslinkers in 2-component polyurethane coating compositions.

The polyisocyanates I and the abovementioned mixtures (M) are particularly suitable as component B in the preparation of 2-component coating materials which as component A comprise a compound which carries polyisocyanate-reactive groups, preferably a hydroxy-functional polymer (A).

Said hydroxy-functional polymers (A) are, for example, polymers having a hydroxyl group content of from 0.1 to 20, preferably from 0.5 to 10% by weight. The number-average molecular weight $M_n$ of the polymers is preferably from 1000 to 100,000, with particular preference 2000 to 10,000. The polymers concerned are preferably those which consist of more than 50% by weight of $C_1$–$C_{20}$ alkyl (meth)acrylate, vinylaromatic compounds having up to 20 carbon atoms, vinyl esters of carboxylic acids containing up to 20 carbon atoms, vinyl halides, nonaromatic hydrocarbons having 4 to 8 carbon atoms and 1 or 2 double bonds, unsaturated nitriles, and mixtures thereof. Particular preference is given to those polymers which consist of more than 60% by weight of $C_1$–$C_{10}$ alkyl (meth)acrylates, styrene, or mixtures thereof.

The polymers (A) further comprise hydroxy-functional monomers in accordance with the above hydroxyl group content and, if desired, further monomers, examples being ethylenically unsaturated acids, especially carboxylic acids, acid anhydrides or acid amides.

Examples of further polymers (A) are polyesterols, as are obtainable by condensing polycarboxylic acids, especially dicarboxylic acids, with polyols, especially diols.

Further suitable polymers (A) are polyetherols, which are prepared by addition reaction of ethylene oxide, propylene oxide or butylene oxide onto H-active components. Polycondensates of butanediol are also suitable.

The polymers (A) may of course also comprise compounds having primary or secondary amino groups.

Mention may be made, for example, of products known as Jeffamines, i.e., amino-terminated polyetherols, or oxazolidines.

In addition to the abovementioned components A and B, the 2-component coating compositions may further comprise other polyisocyanates and compounds having polyisocyanate-reactive groups, as are normally present in two-component coating materials.

The molar ratio formed from the sum of the isocyanate groups in the components B to the sum of the isocyanate-reactive groups of component (A) is preferably from 0.6:1 to 1.4:1, more preferably from 0.7:1 to 1.3:1, with very particular preference 1:1.

The coating materials of the invention may further comprise organic solvents, examples being xylene, butyl acetate, methyl isobutyl ketone, methoxypropyl acetate, and N-methylpyrrolidone. Solvents are used to establish the low viscosity which is desired for the processing of the coating material, i.e., for its application to substrates.

The coating materials may of course comprise further additives customary in coatings technology, examples being pigments, fillers, leveling assistants, etc.

They may further comprise catalysts for urethane formation, e.g., dibutyltin dilaurate.

The two-component polyurethane coating compositions may be prepared in conventional manner. Commonly, components A and B are mixed before the coating compositions are applied to a substrate. Mixing takes place normally from 0 to 12 h before application. The desired viscosity may be established using solvent.

The polyurethane coating compositions may be applied two-dimensionally to substrates in conventional manner by spraying, pouring, rolling, brushing, knife-coating, etc.

The coating compositions are particularly suitable for workpieces with surfaces of metal, plastic, wood, woodbase materials, ceramic, or glass.

The articles coated by these processes feature a surface which has very good mechanical properties—in particular, good hardness, flexibility, and chemical resistance.

Experimental Section

A. Preparing the Polyisocyanates of the Invention

1. Preparing Polyisocyanates Containing Urethane Groups and Allophanate Groups

Hexamethylene diisocyanate (HDI) is charged to a reaction vessel under nitrogen blanketing and is heated to 100° C. At this temperature, the amount of diol specified in Table 1 is added. The mixture is heated to 160° C. and left to react at this temperature and the reaction is ended when the mixture attains the NCO specified in Table 1. The reaction mixture is subsequently distilled in a thin-film evaporator at an oil temperature of 165° C. and a pressure of 2.5 mbar in order to remove unreacted HDI.

Data for the end products are given in Table 1.

2. Preparing a Polyisocyanate Containing Urethane Groups and Isocyanurate Groups and Allophanate Groups 2500 g of hexamethylene diisocyanate (HDI) are charged to a reaction vessel under nitrogen blanketing and are heated to 100° C. At this temperature, 43 g (2.5 mol %) of 1,4-cyclohexanediol are added. After the diol has dissolved, the mixture is cooled to 80° C. and 200 ppm by weight (based on diisocyanate) of the catalyst N,N,N-trimethyl-N-(2-hydroxypropyl)ammonium 2-ethylhexanoate are added. After the catalyst has been added, the temperature rises to 120° C. The batch is allowed to react at this tempeature and the reaction is stopped when the mixture has an NCO content of 41% by weight, by adding 250 ppm by weight (based on diisocyanate) of di-2-(ethylhexyl) phosphate. The reaction mixture is subsequently distilled in a thin-film evaporator at an oil temperature of 165° C. and at 2.5 mbar in order to remove monomeric HDI. The end product had a NCO content of 21.0% by weight and a viscosity at 25° C. of 4480 mPas.

B. Producing and Testing Clearcoats from the Polyisocyanates of the Invention

By way of example, a polyisocyanate of the invention was mixed with a hydroxy-functional acrylate resin (Lumitol® H 136, BASF AG), in comparison to a standard polyisocyanate hardener (Basonat® HI 100, BASF AG), in accordance with the stoichiometric OH/NCO ratios. Adjustment to an application viscosity of 20 s (DIN 53 211 cup 4 mm efflux nozzle) was made using butyl acetate. Coatings with a wet film thickness of 200 μm were applied to glass plates using a film-drawing frame. The resultant clearcoats were cured under standard climatic conditions.

The coating material prepared with the crosslinker of the invention, as compared with a coating material comprising standard crosslinker (coating material No. 1 Compar.) features quicker physical drying and a much quicker increase in hardness (pendulum attenuation).

All coating materials, moreover, display good flexibility, adhesion, and scratch resistance.

The results of testing are given in Table 2.

TABLE 1

Reaction products of HDI and dialcohols

| Poly-isocyanate | Diol | Amount based on isocyanate (mol %) | NCO content of the mixture after reaction (% by wt.) | NCO content after distillation (% by wt.) | Viscosity at 25° C. (mPas) |
|---|---|---|---|---|---|
| 1 | 1,4-cyclohexanediol | 10 | 38.0 | 18.4 | 9000 |
| 2 | 1,3-cyclohexanediol | 10 | 37.6 | 18.4 | 12,400 |
| 3 | 1,4-cyclohexanedi-methanol | 10 | 37.9 | 17.7 | 6730 |

TABLE 2

Improved curing relative to prior art

| Coating composition | | |
|---|---|---|
| Coating material No. | 1 (Compar.) | 2 |
| Polyisocyanate crosslinker | HI 100 | 1 (see Tab.1) |
| Hydroxy acrylate | H 136 | H 136 |

Coating drying (sand drying=time after which sand sprinkled on can be removed from the drying film surface using a brush, without exerting force)

| Sand drying [h] | 10 | 1 |

Film hardness
Pendulum attenuation, König [swings]

|  | after 5 h | 7 | 9 |
|---|---|---|---|
|  | after 1 day | 62 | 90 |

H 136=Lumitol® H 136 (BASF AG), hydroxy-functional acrylate resin, solids content=70% by weight, OH number=135 mg KOH/g.

HI 100=Basonat® HI 100, HDI polyisocyanate (BASF AG), viscosity approx. 3000 mPas, solids content=100%, NCO=22% by weight

We claim:

1. A polyisocyanate of the formula (I) (polyisocyanate I), $$OCN-R^1-[-NX-CO-O-R^2-O-CO-NX-R^1-]_n-NCO \quad (I)$$

in which the units $R^1$, X and $R^2$ have the following meanings:

$R^1$ is a unit of the formula (II)

$$-CH_2-CH_2-CH_2-CH_2-CH_2-CH_2- \quad (II)$$

X is hydrogen or a unit of the formula (III)

$$-CO-NH-R^1-NCO \quad (III)$$

with the proviso that at least one of the units X in the polyisocyanates of the formula I is a unit of the formula III; and $R^2$ is a 4-, 5- or 6-membered cycloalkylene radical in which up to 4 hydrogen atoms may be substituted by $C_1$ to $C_4$ alkyl radicals and one or two methylene units may be substituted by an oxygen atom, a sulfur atom and/or a tertiary nitrogen atom which additionally carries a $C_1$ to $C_4$ alkyl radical, or is a $C_2$ to $C_4$ alkylene radical in which inserted between 2 carbon atoms or between one carbon atom and a hydrogen atom there is a 4-, 5- or 6-membered cycloalkylene radical in which up to 4 hydrogen atoms may be substituted by $C_1$ to $C_4$ alkyl radicals and one or two methylene units may be substituted by an oxygen atom, a sulfur atom and/or a tertiary nitrogen atom which additionally carries a $C_1$ to $C_4$ alkyl radical, and the index n is 1, 2 or 3.

2. A polyisocyanate as claimed in claim 1, wherein n is 1 and both units X are units of the formula III.

3. A polyisocyanate as claimed in claim 1, wherein n is 1, one of the two units X is hydrogen and the other unit X is a unit of the formula III.

4. A mixture comprising:
polyisocyanates as claimed in claim 1,
urethanes of the formula IV (urethane IV), $$OCN-R^1-[-NH-CO-O-R^2-O-CO-NH-R^1-]_p-NCO \quad IV$$

in which the units $R^1$ and $R^2$ are as defined for formula I (urethane IV) and p is a number from 1 to 3,
polyisocyanurates derived from hexamethylene diisocyanate.

5. A mixture as claimed in claim 4, wherein the fraction of hexamethylene diisocyanate is less than 0.5% by weight.

6. A mixture as claimed in claim 4 or 5, wherein the fraction of polyisocyanates I is at least 10% by weight.

7. A mixture as claimed in claim 4 or 5, containing 20–80% by weight of polyisocyanates I, 0–50% by weight of polyurethanes IV and 0–80% by weight of polyisocyanurates derived from hexamethylene diisocyanate.

8. A polyisocyanate I as claimed in claim 1, wherein the unit $R^2$ is derived from 1,3- or 1,4-cyclohexanediol, 1,4-cyclohexanedimethanol, 1,3-cyclopentanediol or tetramethyl-1,3-cyclobutanediol.

9. A process for preparing a mixture as claimed in claim 4, which comprises:
(i) reacting hexamethylene diisocyanate with a
divalent 4-, 5- or 6-membered cycloaliphatic alcohol in which up to 4 carbon atoms attached to a carbon atom may be substituted by $C_1$ to $C_4$-alkyl radicals and one or two methylene units may be substituted by an oxygen atom, a sulfur atom and/or a tertiary nitrogen atom which additionally carries a $C_1$ to $C_4$-alkyl radical, or
divalent $C_2$ to $C_4$-alkanediol in which inserted between 2 carbon atoms or between one carbon atom and a hydrogen atom there is a 4-, 5- or 6-membered cycloalkylene radical in which up to 4 hydrogen atoms may be substituted by $C_1$ to $C_4$-alkyl radicals and one or two methylene units may be substituted by an oxygen atom, a sulfur atom and/or a tertiary nitrogen atom which additionally carries a $C_1$ to $C_4$-alkyl radical,
the molar ratio of hexamethylene diisocyanate to the above-mentioned alkanediols being from 50:1 to 3:1, in the presence or absence of a catalyst which accelerates the formation of allophanates and urethanes,
(ii) deactivating the catalyst, if present, and
(iii) removing any unreacted isocyanate.

10. A two-component coating composition comprising a compound which carries polyisocyanate-reactive groups (component A) and a compound of formula (I) (component B):

$$OCN-R^1-[-NXCO-O-R^2-O-CO-NXR^1-]_n-NCO \quad (I)$$

in which the units $R^1$, X and $R^2$ have the meanings:

$R^1$ is a unit of the formula (II):

$$-CH_2-CH_2-CH_2-CH_2-CH_2-CH_2- \quad (II)$$

X is hydrogen or a unit of the formula (III):

$$-CO-NH-R^1-NCO \quad (III),$$

with the proviso that at least one of the units X in the polyisocyanates is a unit of formula (III) and $R^2$ is 1,3- or 1,4-cyclohexylene, 1,4-cyclohexanedimethylene, 1,3-cyclopentylene or tetramethyl-1,3-cyclobutylene; and n is 1,2 or 3.

11. A method of coating an article, which comprises:
i) preparing a coating composition as claimed in claim 10 by mixing components A and B, and
ii) within hours after its preparation, applying the coating composition two-dimensionally to an article.

12. A coated article produced as claimed in claim 11.

* * * * *